Feb. 18, 1930.  A. O. HURXTHAL  1,747,832
BATTER GAUGE FOR WAFFLE IRONS
Filed May 28, 1929
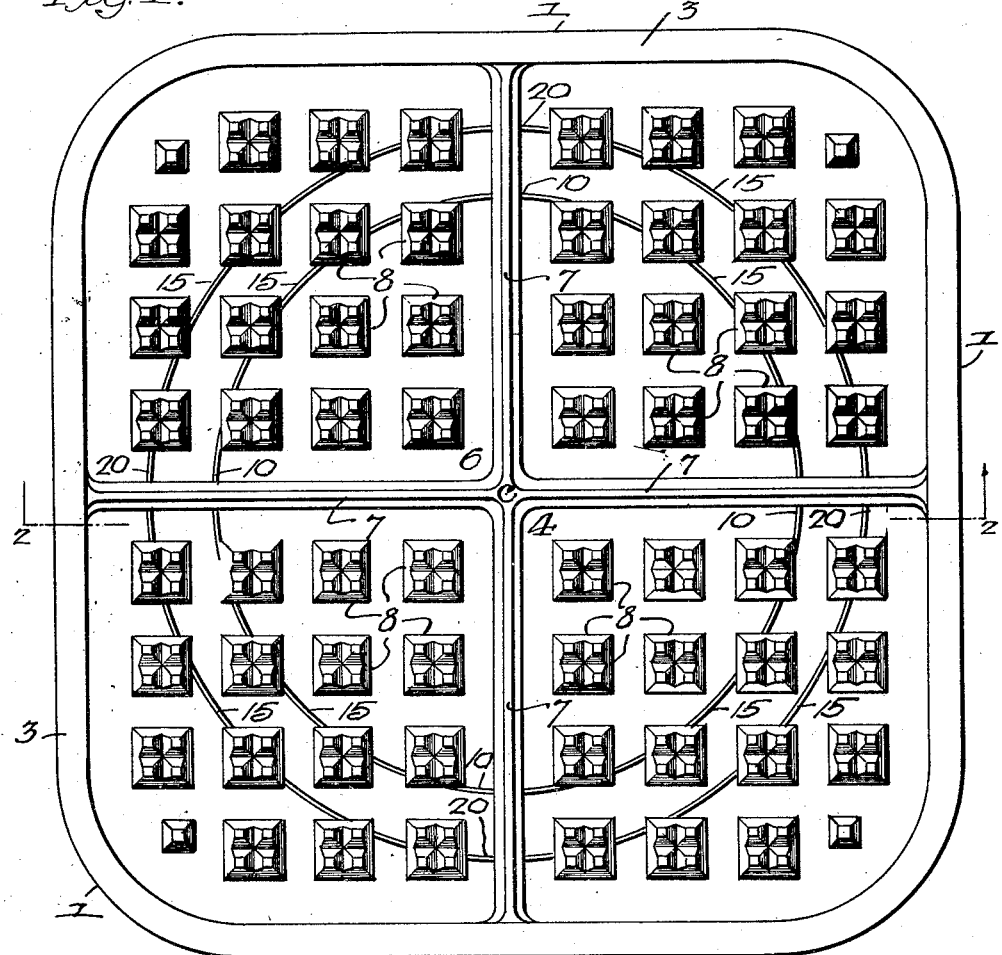
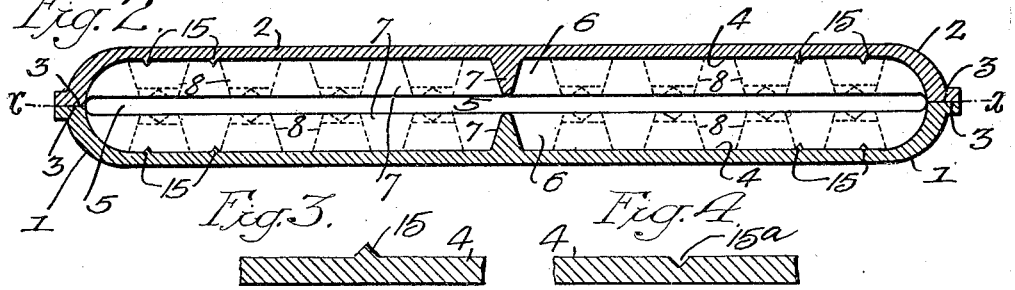

Patented Feb. 18, 1930

1,747,832

UNITED STATES PATENT OFFICE

ALPHEUS O. HURXTHAL, OF PHILADELPHIA, PENNSYLVANIA, ASSIGNOR, BY MESNE ASSIGNMENTS, TO PROCTOR & SCHWARTZ ELECTRIC COMPANY, OF PHILADELPHIA, PENNSYLVANIA, A CORPORATION OF PENNSYLVANIA

BATTER GAUGE FOR WAFFLE IRONS

Application filed May 28, 1929. Serial No. 366,705.

This invention relates to means for determining the proper amount of batter to be placed in a batter-cake mold, such as a waffle iron, in order that when the batter expands, under the influence of the heat applied to the waffle iron to cook the waffle the waffle iron will be completely, but not excessively, filled; so that the batter will not be extruded between the sections of the iron when the batter expands.

In practice, according to the theory and principles of my invention, I am able to produce a waffle devoid of the undesirable fins so frequently occurring at the places where the sections of the iron join due to too much batter having been placed in the waffle iron; and at the same time produce a waffle which will be substantially the same color throughout its entire area; due to the proper amount of batter having been placed in the waffle iron and the batter having been brought into intimate contact with all points of the interior surface of the waffle iron by the expansion of the batter.

When an insufficient amount of batter is placed in a waffle iron the batter will not completely fill the iron when the batter expands and those parts of the waffle which have not been in intimate contact with the inner surface of the waffle iron will be pale and doughy, while those portions of the waffle which have been in intimate contact with the interior surface of the iron will assume a golden brown color, which may be lightened or darkened as desired by the proper application of heat to the waffle iron.

Obviously my invention, which will be hereinafter described in detail, is applicable to the ordinary simple type of waffle iron comprising merely two similar concaved grids or plates provided with stumps or other devices for producing ornamental designs on or in the waffle, the grids being pivotally or otherwise attached to each other with their concaved surfaces in opposed relation to each other, heat being applied to the assembled iron by any common source, such as wood or coal fire; or oil or gas flame; or the invention is applicable in the same manner to the more modern types of electrically heated waffle irons such as shown and described in my co-pending application, Serial Number 208,829, filed July 27, 1927.

Referring to the drawings:

Fig. 1 is a plan view of one of the grids of a waffle iron;

Fig. 2 is a sectional elevation of a waffle iron, taken on the line 2—2, Fig. 1, and showing a pair of grids in co-operative relation to each other;

Fig. 3 is an enlarged sectional elevation of a portion of a grid showing my invention as applied thereto; and Fig. 4 is a view similar to Fig. 3, but showing a modification within the scope of the invention.

As shown in Figs. 1 and 2, the waffle iron comprises a pair of grids 1 and 2, which for all intents and purposes may be of identical construction, each grid having a contact surface 3 formed around and adjacent its outer edge.

Obviously each grid may be square, rectangular, circular, or of any other desired configuration, without departing from the spirit of the present invention.

Within the area defined by the contact surface 3, each grid is depressed, or concaved, the surface 4 of the depressed area being in a plane substantially parallel to the plane of the contact surface 3, but spaced apart therefrom, so that when the two grids are placed together with the surfaces 3, 3 in contact with each other a batter-receiving cavity 5 is produced, partly by the concavity 6 of one grid and partly by the concavity 6 of the other grid.

Projecting substantially perpendicular to and from the depressed surface 4 of each grid is a plurality of continuous ribs 7, corresponding ones of which project from the respective grids toward each other, but not to the dividing plane $x$ of the waffle iron, to produce dividing fines or crevices in the finished waffle.

Also, projecting from the depressed surface 4 of each grid is a plurality of stumps 8 which may be of any desired configuration for producing desired designs in the finished waffle and further functioning as a means for carrying the heat, applied to the waffle iron, into the body of batter so that the waffle will be cooked completely through, by the heat radiating from the said stumps and ribs.

Experience, through experiment, has proven that the amount of batter required to completely but not excessively fill the waffle cavity 5 of the waffle iron may be definitely determined by calibrating the spread of the batter over the surface 4 of one of the grids when the batter is poured onto said grid at a point substantially at the center of the grid, while the grid is in a substantially horizontal plane; and that the thinner the batter, the greater the spread thereof for the definite volume of the finished waffle; and the thicker the batter, the smaller the spread thereof, for the same final volume.

In accordance with the above described theory and principle, I have provided simple and efficient means for employing the same in practice.

My invention consists in providing a batter gauge comprising the provision of indicating points, or a line, or a plurality of lines disposed around the center of one or both of the grids of which the waffle iron is composed, so that no matter which of said grids is placed in position to receive the batter the gauge will be evident.

Broadly, the gauge comprises a plurality of indicating points 10, 10, which are distinct and clearly distinguishable from any and all other parts, protuberances or other markings on the grid, and disposed equidistantly from the center $c$ of the grid, and disposed at points, equidistant or otherwise spaced from each other around a circle whose center is coincident with the center $c$ of the grid.

A second set of indicating points 20, 20 are disposed in the same general manner as above noted, but at a greater distance from the center $c$ than the corresponding indicating points 10, 10.

The inner set of indicating points 10, 10, function in connection with a heavy batter, or a batter of greater viscosity; while the outer set of indicating points 20, 20 function in connection with a lighter batter, or a batter of lesser viscosity.

These indicating points may be in the form of projections extending from and above the plane of the depressed surface 4 of the grid, as indicated at 15 in Fig. 3; or they may be in the form of depressions as indicated at 15$^a$ in Fig. 4.

As shown in Fig. 1, the indicating points 10, 10 and 20, 20 are continuations of circles struck from the center $c$ of the grid, in concentric relation to each other.

In operation, a mass of batter being poured on the grid at the center $c$ thereof, if the batter be of the heavier consistency, spreads over the surface 4 of the grid in all directions from the center $c$ thereof, thus when the outer edge of the mass of batter reaches the indicating points 10, 10 the person pouring the batter will know that there is sufficient batter on the grid to completely fill the waffle cavity 5 when the waffle is cooked.

If the batter be of the thinner consistency the batter is poured until the outer edges of the mass reaches the outer indicating points 20, 20, and the result will be the same as above noted.

From the above, it will be obvious that I have produced a means for definitely determining the amount of batter to be poured onto the grid of a waffle iron to produce a substantially perfect waffle when cooked, thus eliminating the hit or miss method now in common use, which produces in most cases imperfect waffles, which have either an unsightly and undesirable fringe of hard crusted batter around their outer edges caused by too much batter having been placed in the waffle iron; or else waffles which have soft doughy and unbrowned spots here and there over their surfaces caused by insufficient batter having been placed in the waffle iron.

While I have described my invention in connection with a waffle iron, obviously the principle involved is applicable to other forms of closed cake molds, open cake pans or griddles, and other batter-cooking utensils.

I claim:

1. In a batter cooking utensil, a gauge located around the center thereof, for determining the correct amount of batter to be placed in said utensil to prevent the overflow of said batter when the same expands within said utensil.

2. In a batter cooking utensil, a gauge located around the center thereof, for determining the correct amount of batter to be placed in said utensil to fill the same when the batter expands within the said utensil.

3. In a batter-cake mold, a gauge located around the center thereof, for determining the correct amount of batter to be placed in said mold to fill the mold completely when the batter expands within the said mold.

4. In a batter-cake mold, a gauge located within said mold and around the center thereof, for determining the correct amount of batter to be placed in said mold to fill the mold completely when the batter expands within the said mold.

5. In a batter-cake mold, a gauge located around the center thereof and formed integral therewith, for determining the correct amount of batter to be placed in said mold to fill the mold completely when the batter expands within the said mold.

6. In a batter-cake mold, a gauge located around and concentric with the center thereof, for determining the correct amount of batter to be placed in said mold to fill the mold completely when the batter expands within the said mold.

7. In a batter-cake mold, a gauge located within said mold and around the center thereof and formed integral therewith, for determining the correct amount of batter to be placed in said mold to fill the mold completely when the batter expands within the said mold.

8. In a batter-cake mold, a gauge located within said mold and around and concentric with the center thereof and formed integral therewith, for determining the correct amount of batter to be placed in said mold to fill the mold completely when the batter expands within the said mold.

9. In a closed waffle iron comprising a plurality of relatively movable sections co-operatively forming a waffle cavity, a gauge in one of said sections adapted to determine the proper amount of batter to be placed in the waffle iron to fill the same completely when the batter expands.

10. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands.

11. In a closed waffle iron comprising a plurality of relatively movable sections co-operatively forming a waffle cavity, at least one of said sections comprising a substantially flat plate, a gauge formed on said plate around the center thereof and adapted to determine the proper amount of batter to be poured onto the plate to fill the waffle iron completely when the batter expands.

12. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge comprising an indicating mark located at a predetermined point spaced from the center of said plate.

13. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge comprising a plurality of indicating marks located at predetermined points spaced from the center of said plate in substantially diametrically opposed relation to each other.

14. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge comprising a plurality of indicating marks located at predetermined points spaced substantially equidistant from the center of said plate.

15. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge comprising a plurality of indicating marks located at predetermined points spaced substantially equidistant from the center of said plate and disposed on a circle the center of which is substantially coincident with the center of said plate.

16. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge having a surface disposed in a plane substantially parallel with and spaced to one side of the batter-receiving surface of said plate and spaced apart from the center of said plate.

17. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge having a surface disposed in a plane substantially parallel with and spaced to one side of the batter-receiving surface of said plate and spaced apart from and substantially concentric with respect to the center of said plate.

18. In a closed waffle iron comprising a plurality of relatively movable sections co-operatively forming a waffle cavity, at least one of said sections comprising a substantially flat plate, a gauge on said plate adapted to determine the proper amount of batter to be poured onto the plate to fill the waffle iron completely when the batter expands, said gauge comprising an annular rib projecting from the batter-receiving surface of said plate and disposed substantially concentric with respect to the center of said plate.

19. In a closed waffle iron comprising a plurality of relatively movable sections co-operatively forming a waffle cavity, at least one of said sections comprising a plate adapted to receive a mass of batter, said plate having a plurality of stumps and ribs projecting from said surface into the waffle cavity, to produce suitable designs and dividing marks on a waffle cooked in said waffle iron; a batter gauge for determining the proper amount of batter to be placed on said plate to fill the waffle cavity completely when the batter expands, said gauge comprising an annular rib, disposed substantially concentric with respect to the center of said plate, formed integral with said plate, and adapted, by virtue of its proportions and outline with respect to the same characteristics of said stumps and separator ribs, to be readily distinguishable therefrom for facilitating the purpose for which the gauge is intended.

ALPHEUS O. HURXTHAL.